(12) United States Patent
Hashmi et al.

(10) Patent No.: US 11,366,891 B2
(45) Date of Patent: Jun. 21, 2022

(54) METHOD AND SYSTEM FOR FACILITATING AN IDENTIFICATION OF AN APPLICATION

(71) Applicant: JPMorgan Chase Bank, N.A., New York, NY (US)

(72) Inventors: Syed Farrukh Hashmi, Carrollton, TX (US); Nishant Mehta, Brooklyn, NY (US); Ravi Nalluri, Frisco, TX (US); Ishmeet K. Mehta, Houston, TX (US); Ily Zislin, New York, NY (US); Bryn Worgan, Mountainside, NJ (US); Michael H. Payne, Santa Barbara, CA (US); Godfrey Paul, Ramsgate (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 247 days.

(21) Appl. No.: 16/693,890

(22) Filed: Nov. 25, 2019

(65) Prior Publication Data

US 2021/0157896 A1 May 27, 2021

(51) Int. Cl.
*G06F 21/44* (2013.01)
*H04L 9/40* (2022.01)
*G06F 21/41* (2013.01)

(52) U.S. Cl.
CPC .............. *G06F 21/44* (2013.01); *G06F 21/41* (2013.01); *H04L 63/0281* (2013.01);
(Continued)

(58) Field of Classification Search
CPC ............. H04L 63/0815; H04L 63/0281; H04L 63/0807; H04L 63/0853; H04L 63/102; H04L 63/083; G06F 21/41; G06F 21/44
See application file for complete search history.

(56) References Cited

U.S. PATENT DOCUMENTS

| 8,918,529 B1 * | 12/2014 | Batchu | H04L 63/20 709/229 |
| 9,225,707 B1 * | 12/2015 | de Sousa | G06F 21/629 |

(Continued)

OTHER PUBLICATIONS

Y. Zhu, R. Yu, D. Ma and W. Cheng-Chung Chu, "Cryptographic Attribute-Based Access Control (ABAC) for Secure Decision Making of Dynamic Policy With Multiauthority Attribute Tokens," in IEEE Transactions on Reliability, vol. 68, No. 4, pp. 1330-1346 (Year: 2019).*

(Continued)

*Primary Examiner* — Kari L Schmidt
(74) *Attorney, Agent, or Firm* — Greenblum & Bernstein, P.L.C.

(57) ABSTRACT

Systems and methods for facilitating an identification of an application that runs on a platform are provided. The method includes receiving a request to deploy an instance of the application on the platform and an authentication credential relating to an owner of the application; authenticating the request; deploying the instance of the application on the platform; recording an association between the owner and the instance of the application; initiating an execution of the instance of the application without the authentication credential; issuing a platform-local identity token to the instance of the application; authenticating a request for a token describing the application owner using the platform-local identity token; receiving the requested token; providing a platform identity to an enterprise service; receiving a token describing an enterprise identity; receiving an authentication credential relating to the application owner; and using the authentication credential with respect to at least one other application.

18 Claims, 7 Drawing Sheets

(52) U.S. Cl.
CPC ........ *H04L 63/083* (2013.01); *H04L 63/0807* (2013.01); *H04L 63/0815* (2013.01); *H04L 63/0853* (2013.01); *H04L 63/102* (2013.01)

(56) References Cited

U.S. PATENT DOCUMENTS

| | | | | |
|---|---|---|---|---|
| 9,426,155 | B2* | 8/2016 | Chao | H04L 63/0815 |
| 10,623,446 | B1* | 4/2020 | Stoler | H04L 63/083 |
| 10,749,854 | B2* | 8/2020 | Doitch | G06F 21/6218 |
| 10,855,669 | B2* | 12/2020 | Shaw | H04W 12/06 |
| 10,979,416 | B2* | 4/2021 | Kulkarni | H04L 63/062 |
| 2003/0163787 | A1* | 8/2003 | Hay | G06Q 30/06 |
| | | | | 715/248 |
| 2009/0228967 | A1* | 9/2009 | Gbadegesin | H04L 9/3234 |
| | | | | 726/8 |
| 2009/0300607 | A1* | 12/2009 | Ferris | G06F 9/45558 |
| | | | | 718/1 |
| 2011/0277027 | A1* | 11/2011 | Hayton | H04L 63/0815 |
| | | | | 726/8 |
| 2012/0265976 | A1* | 10/2012 | Spiers | G06F 9/45533 |
| | | | | 713/2 |
| 2013/0227140 | A1* | 8/2013 | Hinton | H04L 41/00 |
| | | | | 709/225 |
| 2014/0075565 | A1* | 3/2014 | Srinivasan | H04L 41/5054 |
| | | | | 726/26 |
| 2014/0101310 | A1* | 4/2014 | Savage | H04L 43/00 |
| | | | | 709/224 |
| 2016/0180076 | A1* | 6/2016 | Katieb | G06F 21/41 |
| | | | | 726/6 |
| 2017/0012951 | A1* | 1/2017 | Mennes | H04L 63/06 |
| 2018/0288031 | A1 | 10/2018 | Kumar | |
| 2018/0337914 | A1* | 11/2018 | Mohamad Abdul | |
| | | | | H04L 9/3213 |
| 2019/0050551 | A1* | 2/2019 | Goldman-Kirst | H04L 9/3213 |
| 2019/0058706 | A1* | 2/2019 | Feijoo | H04L 63/0807 |
| 2019/0349357 | A1* | 11/2019 | Shukla | H04L 63/20 |
| 2020/0004946 | A1* | 1/2020 | Gilpin | H04L 63/10 |
| 2020/0067907 | A1* | 2/2020 | Avetisov | H04L 9/0825 |
| 2020/0162454 | A1* | 5/2020 | Jain | H04W 12/084 |

OTHER PUBLICATIONS

Wang, Yige, Ruizhu Huang, and Weijia Xu. "Authentication with User Driven Web Application for Accessing Remote Resources." Proceedings of the Practice and Experience on Advanced Research Computing. 2018. 1-7. (Year: 2018).*

T. Reimer, P. Abraham and Q. Tan, "Federated Identity Access Broker Pattern for Cloud Computing," 2013 16th International Conference on Network-Based Information Systems, 2013, pp. 134-140 (Year: 2013).*

International Search Report and Written Opinion of the International Searching Authority Application No. PCT/US20/62042, dated Mar. 11, 2021.

* cited by examiner

METHOD AND SYSTEM FOR FACILITATING AN IDENTIFICATION OF AN APPLICATION

BACKGROUND

1. Field of the Disclosure

This technology generally relates to methods and systems for facilitating an identification of an application that runs on a platform.

2. Background Information

As many organizations are moving toward using computer-network authentication protocols to establish the identity of a principal, each application has to also interface with the organization's computer-network authentication protocol infrastructure, obtain tokens, and manage the token lifecycle.

This is especially challenging in a cloud platform where the application runs in a dynamic environment and cannot rely on long-established linkages to physical assets to establish its identity.

As a result, applications that are integrated into the organizational structure must ensure that their identities are established. Satisfying such requirements is often cumbersome, draining valuable time that can be spent in delivering business value. These problems may adversely impact the developer experience as more teams use cloud platforms.

Accordingly, there is a need for a method to facilitate an identification of an application that runs on a platform by establishing the identity of the applications that run on the platform and making the identity available, for example, to application containers, nodes, workers, minions, or machines where workloads are deployed such that the applications can seamlessly connect to other services without the need for authentication such as passwords.

SUMMARY

The present disclosure, through one or more of its various aspects, embodiments, and/or specific features or sub-components, provides, inter alia, various systems, servers, devices, methods, media, programs, and platforms for facilitating an identification of an application.

According to an aspect of the present disclosure, a method for facilitating an identification of an application that runs on a platform that includes at least one processor is provided. The method includes: receiving, by the at least one processor, a request to deploy an instance of the application on the at least one platform and at least one authentication credential relating to an owner of the application; authenticating, by the at least one processor, the request to deploy the instance of the application on the at least one platform using the at least one authentication credential; deploying, by the at least one processor, the instance of the application on the at least one platform based on the authenticating the request to deploy the instance of the application; recording, by the at least one processor, an association between the owner of the application and the instance of the application on the at least one platform; initiating, by the at least one processor, an execution of the instance of the application without the at least one authentication credential; issuing, by the at least one processor, a platform-local identity token to the instance of the application; authenticating, by the at least one processor, a request for a token describing the application owner using the platform-local identity token; receiving, by the at least one processor, the requested token describing the application owner based on the authenticating the request for the token describing the application owner; using, by the at least one processor, the token describing the application owner to request an enterprise token describing an identity of the application; receiving, by the at least one processor, the enterprise token describing the identity of the application when the platform is trusted by the enterprise to be running the application instance; and using, by the at least one processor, the enterprise token describing the identity of the application to authenticate with at least one other application.

According to an exemplary embodiment, the method may further include connecting to the at least one other application.

The enterprise token describing the identity of the application may describe the identity of the application such that the identity of the application is recognized and trusted by the at least one other application.

At least one of the platform-local identity token and the enterprise token describing the identity of the application may include at least one of an application identifier, a platform instance identifier, and a platform tenant space identifier.

The token describing the application owner may include information that relates to an association between a user account and the application.

In an exemplary embodiment, the information that relates to the association between the user account and the application includes information regarding at least one user account that has authorization to deploy the application on behalf of the application owner.

In an exemplary embodiment, at least one of the platform-local identity token, the token describing the application owner, and the enterprise token describing the identity of the application is valid for a predetermined amount of time.

In an exemplary embodiment, upon expiration of the predetermined amount of time, the at least one of the platform-local identity token, the token describing the application owner, and the enterprise token describing the identity of the application is replaced by another access token.

The at least one authentication credential may include a password.

According to another aspect of the present disclosure, a computing apparatus for facilitating an identification of an application that runs on a platform is provided. The computing apparatus includes a processor, a memory, and a communication interface coupled to each of the processor and the memory. The processor is configured to: receive a request to deploy an instance of the application on the at least one platform and at least one authentication credential relating to an owner of the application; authenticate the request to deploy the instance of the application on the at least one platform using the at least one authentication credential; deploy the instance of the application on the at least one platform based on the authenticating the request to deploy the instance of the application; record an association between the owner of the application and the instance of the application on the at least one platform; initiate an execution of the instance of the application without the at least one authentication credential; issue a platform-local identity token to the instance of the application; authenticate a request for a token describing the application owner using the platform-local identity token; receive the requested token describing the application owner based on the authenticating the request for the token describing the application owner; use the token describing the application owner to request an enterprise token describing an identity of the application; receive the enterprise token describing the identity of the application when the platform is trusted by the enterprise to be running the application instance; and use the enterprise token describing the identity of the application to authenticate with at least one other application.

According to an exemplary embodiment, the processor is further configured to connect to the at least one other application.

The enterprise token describing the identity of the application may describe the identity of the application such that the identity of the application is recognized and trusted by the at least one other application.

In an exemplary embodiment, at least one of the platform-local identity token and the enterprise token describing the identity of the application includes at least one of an application identifier, a platform instance identifier, and a platform tenant space identifier.

The token describing the application owner may include information that relates to an association between a user account and the application.

The information that relates to the association between the user account and the application may include information regarding at least one user account that has authorization to deploy the application on behalf of the application owner.

In an exemplary embodiment, at least one of the platform-local identity token, the token describing the application owner, and the enterprise token describing the identity of the application is valid for a predetermined amount of time.

Upon expiration of the predetermined amount of time, the at least one of the platform-local identity token, the token describing the application owner, and the enterprise token describing the identity of the application may be replaced by another access token.

The at least one authentication credential may include a password.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
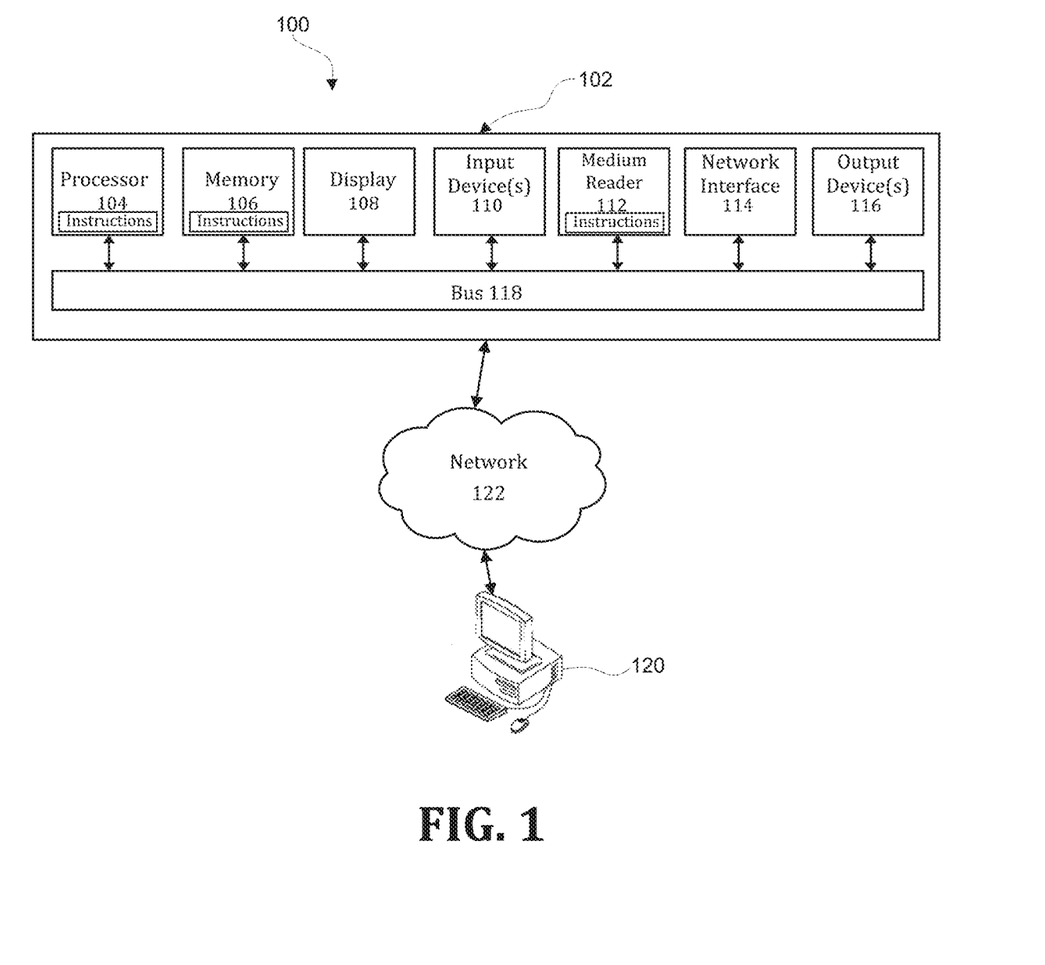
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized methods and systems for facilitating an identification of an application that runs on a platform.

Figure 2:
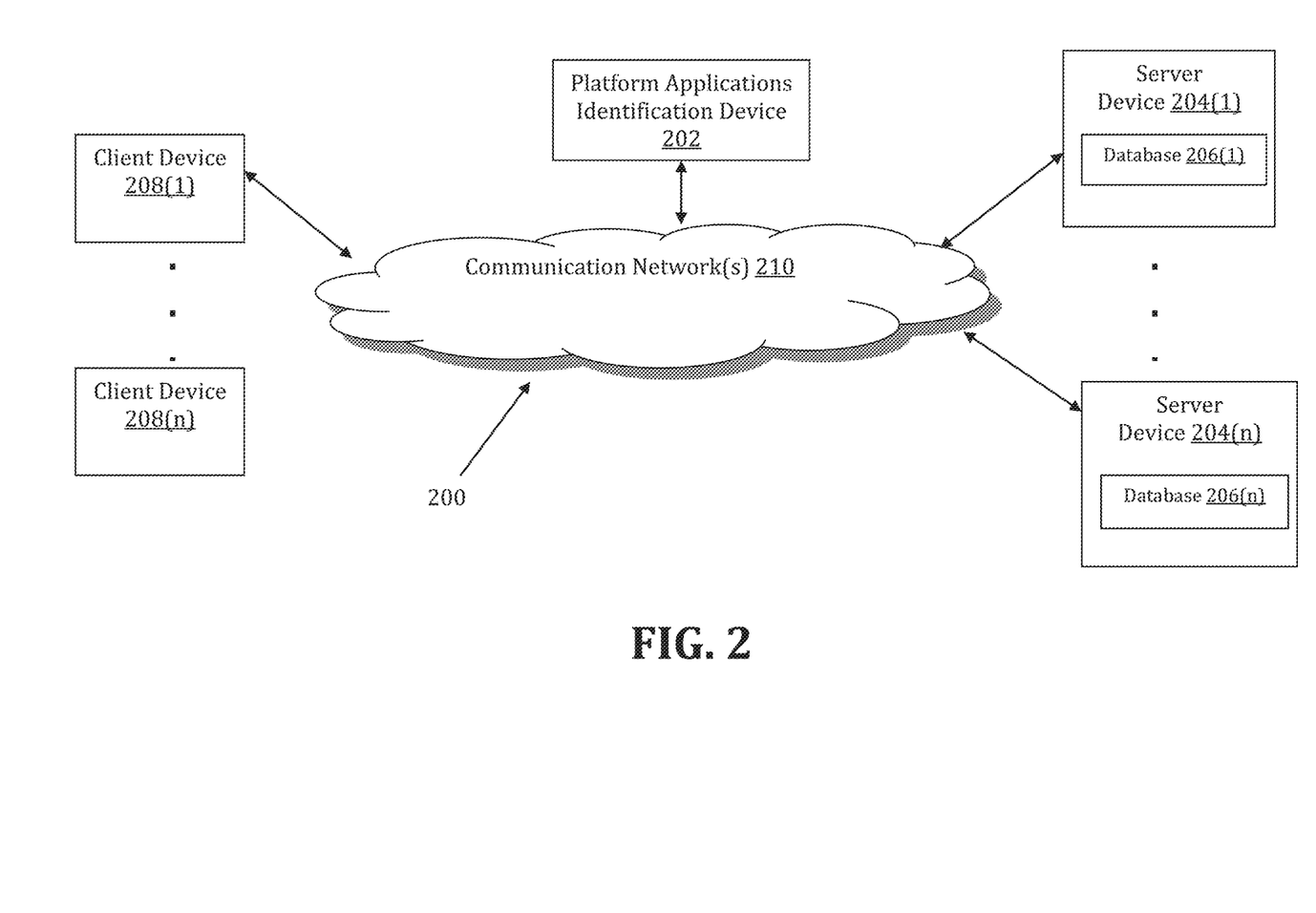
FIG. 2 illustrates an exemplary diagram of a network environment.

Referring to FIG. 2, a schematic of an exemplary network environment 200 for implementing a method for facilitating an identification of an application that runs on a platform is illustrated. In an exemplary embodiment, the method is executable on any networked computer platform, such as, for example, a personal computer (PC).

The method for facilitating an identification of an application that runs on a platform may be implemented by a Platform Applications Identification (PAI) device 202. The PAI device 202 may be the same or similar to the computer system 102 as described with respect to FIG. 1. The PAI device 202 may store at least one application that can include executable instructions that, when executed by the PAI device 202, cause the PAI device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the PAI device 202 itself, may be located in virtual server(s) running in a cloud-based computing environment rather than being tied to one or more specific physical network computing devices. Also, the application(s) may be running in one or more virtual machines (VMs) executing on the PAI device 202. Additionally, in one or more embodiments of this technology, virtual machine(s) running on the PAI device 202 may be managed or supervised by a hypervisor.

In the network environment 200 of FIG. 2, the PAI device 202 is coupled to a plurality of server devices 204(1)-204(n) that hosts a plurality of databases 206(1)-206(n), and also to a plurality of client devices 208(1)-208(n) via communication network(s) 210. A communication interface of the PAI device 202, such as the network interface 114 of the computer system 102 of FIG. 1, operatively couples and communicates between the PAI device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the PAI device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and PAI devices that efficiently implement a method for facilitating an identification of an application that runs on a platform.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The PAI device 202 may be a standalone device or integrated with one or more other devices or apparatuses, such as one or more of the server devices 204(1)-204(n), for example. In one particular example, the PAI device 202 may include or be hosted by one of the server devices 204(1)-204(n), and other arrangements are also possible. Moreover, one or more of the devices of the PAI device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the PAI device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store application-specific data, application tokens, and any other data that is usable for facilitating an identification of an application that runs on a platform.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the PAI device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the PAI device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the PAI device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the PAI device 202, the server devices 204(1)-204(n), or the client devices 208(1)-208(n), for example, may be configured to operate as virtual instances on the same physical machine. In other words, one or more of the PAI device 202, the server devices 204(1)-204(n), or the client devices 208(1)-208(n) may operate on the same physical device rather than as separate devices communicating through communication network(s) 210. Additionally, there may be more or fewer PAI devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
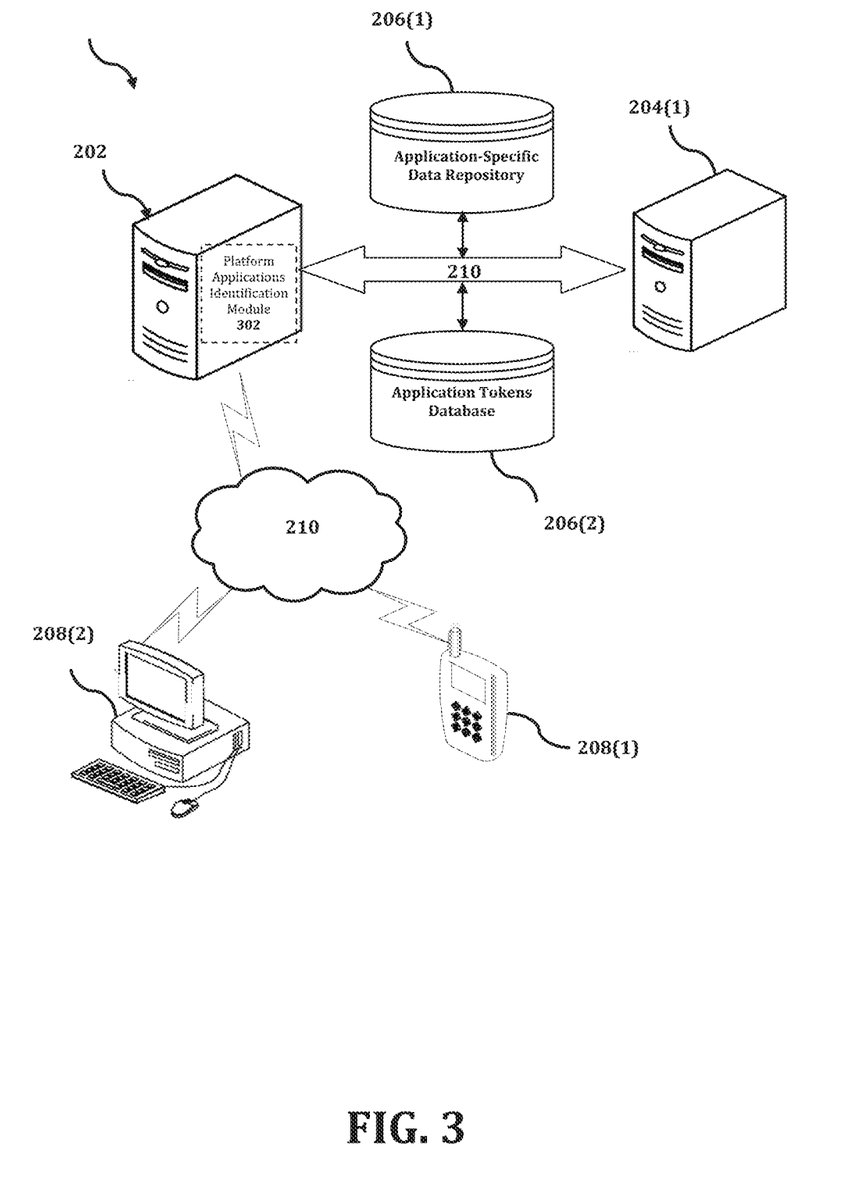
FIG. 3 shows an exemplary system for implementing a method for facilitating an identification of an application that runs on a platform.

The PAI device 202 is described and shown in FIG. 3 as including a PAI module 302, although it may include other rules, policies, modules, databases, or applications, for example. As will be described below, the PAI module 302 is configured to implement a method for facilitating an identification of an application that runs on a platform in an automated, efficient, scalable, and reliable manner.

An exemplary process 300 for facilitating an identification of an application by utilizing the network environment of FIG. 2 is shown as being executed in FIG. 3. Specifically, a first client device 208(1) and a second client device 208(2) are illustrated as being in communication with PAI device 202. In this regard, the first client device 208(1) and the second client device 208(2) may be "clients" of the PAI device 202 and are described herein as such. Nevertheless, it is to be known and understood that the first client device 208(1) and/or the second client device 208(2) need not necessarily be "clients" of the PAI device 202, or any entity described in association therewith herein. Any additional or alternative relationship may exist between either or both of the first client device 208(1) and the second client device 208(2) and the PAI device 202, or no relationship may exist.

Further, PAI device 202 is illustrated as being able to access an application-specific data repository 206(1) and an application tokens database 206(2). The PAI module 302 may be configured to access these databases for implementing a method for facilitating an identification of an application that runs on a platform.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the PAI device 202 via broadband or cellular communication. Of course, these embodiments are merely exemplary and are not limiting or exhaustive.

Upon being started, the PAI module 302 executes a process for facilitating an identification of an application that runs on a platform. An exemplary process for facilitating an identification of an application is generally indicated at flowchart 400 in FIG. 4.

Figure 4:
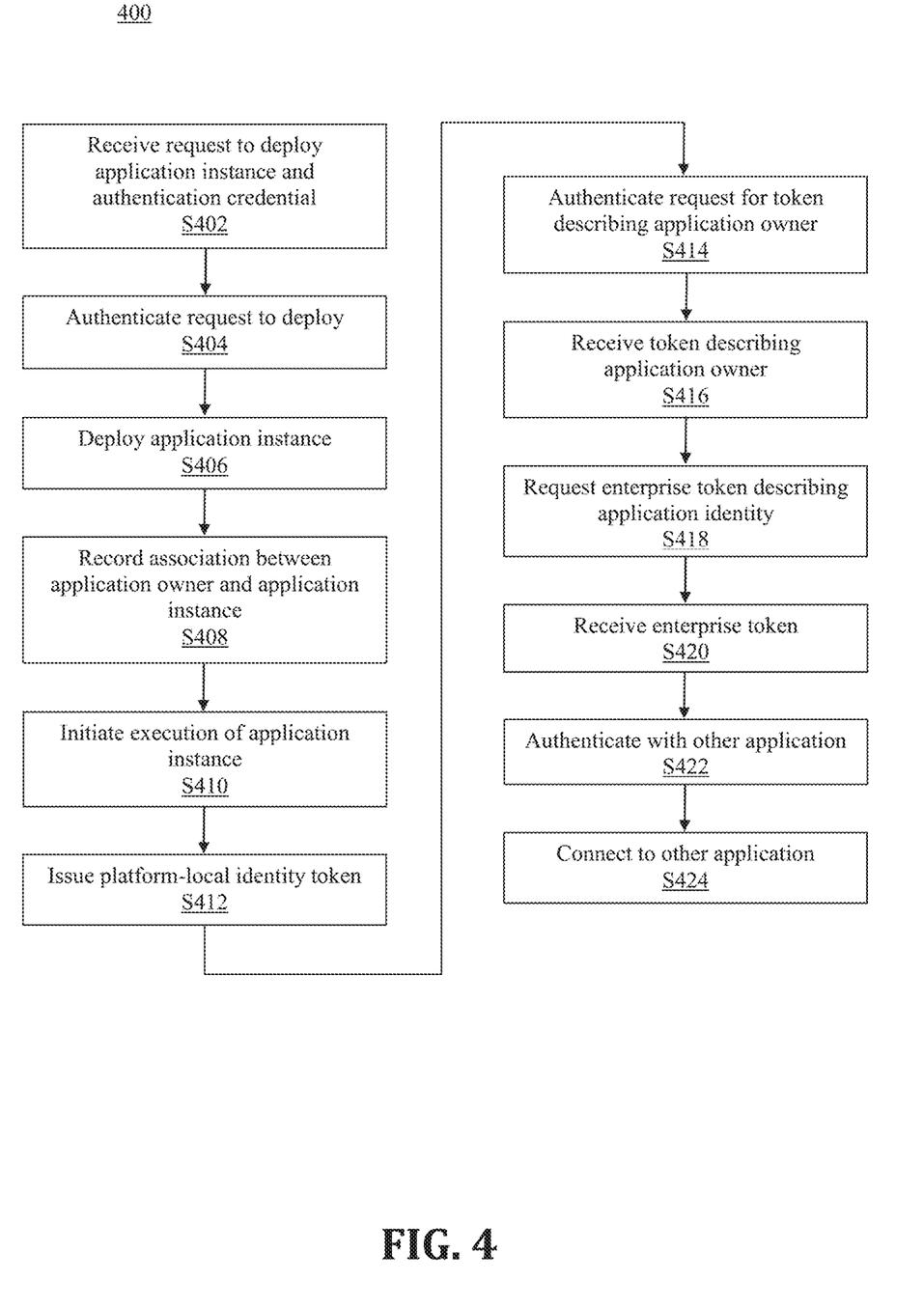
FIG. 4 is a flowchart of an exemplary process for implementing a method for facilitating an identification of an application that runs on a platform.

In the process 400 of FIG. 4, at step S402, the PAI module 302 receives two pieces of information. The PAI module 302 receives (1) a request to deploy an instance of the application on the at least one platform and (2) at least one authentication credential relating to an owner of the application. In an exemplary embodiment, the application may be an enterprise application of a service providing business entity. According to an exemplary embodiment, the at least one authentication credential includes a password.

In an exemplary embodiment, the PAI module 302 may receive the request to deploy the instance of the application after an application owner has registered an intention to deploy the instance of the application on identified platforms in the application-specific data repository. The application owner may have registered the intention to deploy the instance of the application using the at least one enterprise credential to authenticate with the application-specific data repository.

In an exemplary embodiment, at least one of a non-server and non-cloud platform, e.g., a mobile phone or device, is used. In such an embodiment, a device provider certifies that the application instance is a deployment of the application. A device provider may certify that an application instance is a deployment of the application because the application owner may not be aware of an intent to deploy the application.

At step S404, the PAI module 302 authenticates the request to deploy the instance of the application on the at least one platform using the at least one authentication credential.

At step S406, the PAI module 302 deploys the instance of the application on the at least one platform after authenticating the request to deploy the instance of the application.

At step S408, the PAI module 302 records an association between the owner of the application and the instance of the application on the at least one platform.

At step S410, the PAI module 302 initiates an execution of the instance of the application without the at least one authentication credential.

Initiating the application without the at least one enterprise credential may include, e.g., initiating the application without the at least one enterprise credential being transferred into the application or at least one deployment prior to initiation of the same.

Initiating the application without the at least one enterprise credential may be advantageous in that the at least one enterprise credential is protected and not vulnerable to being exposed, exploited, or compromised. Further, initiating the application without the at least one enterprise credential may also be advantageous in that the at least one enterprise credential can be used to create or made into time-limited tokens. The use of time-limited tokens may further protect and/or further decrease the risk of the enterprise-credentials being exposed, exploited, or compromised.

At step S412, the PAI module 302 issues a platform-local identity token to the instance of the application. In an exemplary embodiment, the PAI module 302 issues the application instance with the platform-local identity token. According to an exemplary embodiment, the platform-local identity token may be time-limited and/or may include at least one of an application identifier, a platform instance identifier, and a platform tenant space identifier. In an exemplary embodiment, the platform may issue the application instance with a platform-local identity token and the application may initially use the platform-local identity token to authenticate a request to an "identity provider" running in the platform's context for the platform to issue a token that describes the application owner. In an exemplary embodiment, the platform can issue the token that describes the application owner because the platform recorded the application owner who caused the deployment to be created, and the platform trusts the local credentials the platform issued to the application instance.

At step S414, the PAI module 302 authenticates a request for a token describing the application owner using the issued platform-local identity token. In an exemplary embodiment, the application instance uses the platform-local identity token to authenticate a request to an identity provider of the platform. At least one of the application instance and the identity provider may then issue a token describing the application owner. According to an exemplary embodiment, the token describing the application owner may be time-limited and/or may include information that relates to an association between a user account and the application.

At step S416, the PAI module 302 receives the requested token describing the application owner after authenticating the request for the token describing the application owner. The local credentials issued are trustworthy because the PAI module 302 recorded the association between the application owner and the application instance in step S406.

At step S418, the PAI module 302 uses the token describing the application owner to request an enterprise token describing the identity of the application. In an exemplary embodiment, once the token describing the application owner is received, a request is made to the enterprise using that platform token describing the application owner to get the enterprise token describing the application identity. According to an exemplary embodiment, the enterprise token describing the identity of the application may be time-limited and/or may include at least one of an application identifier, a platform instance identifier, and a platform tenant space identifier.

At step S420, the PAI module 302 receives the enterprise token describing the identity of the application when the platform is trusted by the enterprise to be running the application instance. In an exemplary embodiment, the platform-issued application owner token is traded to get an enterprise identity token when the enterprise trusts the platform to be running the application. At step S422, the PAI module 302 uses the enterprise token describing the identity of the application to authenticate with at least one other application. According to an exemplary embodiment, an enterprise service is an enterprise's identity provider which issues a token that describes the application's identity in a way which would be recognized and trusted by another application within the enterprise. According to an exemplary embodiment, the token usable to authenticate with an application is an enterprise-issued token describing the application. According to another exemplary embodiment, a platform-issued token describing the application recognizes enterprise-issued tokens. The information that relates to the association between the user account and the application may include, e.g., information regarding at least one user account that has authorization to deploy the application on behalf of the application owner. According to an exemplary embodiment, the application instance authenticates the application instance to other application instances.

Then, at step S424, the PAI module 302 connects to the at least one other application. According to an exemplary embodiment, the PAI module 302 uses at least one of an enterprise token describing the identity of the application and an authentication credential to connect to the at least one other application. In an exemplary embodiment, the enterprise token describing the identity of the application may describe the identity of the application such that the identity of the application is recognized and trusted by the at least one other application.

Using the application tokens database, the PAI module 302 may make a determination of trust in an application instance. To determine trust in the application instance, the PAI module 302 may use the result of authentication of step S414. Also, to determine trust in the application instance, the PAI module 302 may use corroborating evidence in the application-specific data repository. The recording of step S408 may provide evidence of a correct instance of the application on the platform. If the PAI module 302 determines the application instance is trustworthy, the application instance may be given enterprise credentials which the application instance can use to authenticate itself to other applications in the enterprise.

According to an exemplary embodiment, at least one of the platform-local identity token, the token describing the application owner, and the enterprise token describing the identity of the application is a time-limited token, i.e., is a token that is valid for a predetermined amount of time. Tune-limited tokens may be replaced with another token. When a token has expired or when a token is soon to expire, an automated process may replace an expired or soon-to-be expired token. A process for replacing a token may be similar to the automated process that originally issued the token.

In a cloud environment, the platform may already have the identity of the applications that run on it. This identity may be established at deployment time and may be maintained throughout the lifecycle of the application. In an exemplary embodiment, the platform may use the established identity to broker an identity token with enterprise scope and make the established identity available to the application in a pre-established location. In an exemplary embodiment, the identity token with enterprise scope may be referred to as a Kerberos Credential Cache (KCC). The application may use the identity token with enterprise scope to obtain tokens that the application may use to connect to services, databases, managed services, etc. In an exemplary embodiment, a KCC is an example of an enterprise-issued token. In another exemplary embodiment, an individual ticket within a KCC is an example of an enterprise-issued token. There may be a plurality of individual tickets within a KCC, and the plurality of individual tickets within the KCC may be example of enterprise-issued tokens.

In an exemplary embodiment, the cloud platform may broker an application's identity by presenting an application identity token to the Kerberos infrastructure in exchange for an identity token with enterprise scope. The application identity token may have a meaning (or scope) that is not recognized or valid between enterprise applications. The application identity token may have a reduced scope when compared with the scope of the identity token with enterprise scope. The scope may include information relating to two or more parties. The application identity token may include or be embodied by a JSON Web Token (JWT). The JWT may contain, for example, metadata about the application and a functional identity that may be assumed by the application. This metadata may be further verified by the Kerberos infrastructure.

In an exemplary embodiment, the platform may establish its own identity to the Kerberos infrastructure using a trust model. The trust model may rely on the following key axioms: The cloud platform may be a trusted entity in the infrastructure that includes tight security guardrails that can prevent applications from spoofing their identities. Even though a cloud platform may have a trusted place in the infrastructure, the cloud platform's identity may be verified by the Kerberos infrastructure for each request. In an exemplary embodiment, the Kerberos infrastructure may verify the identity of the platform based on each entity or deployment of the cloud infrastructure, which may be registered in a central application registry. Any token that the cloud platform presents to the Kerberos infrastructure may be signed using the platform's private key. The corresponding public key may be retrieved from an endpoint that is looked up in the central application registry.

Figure 5:
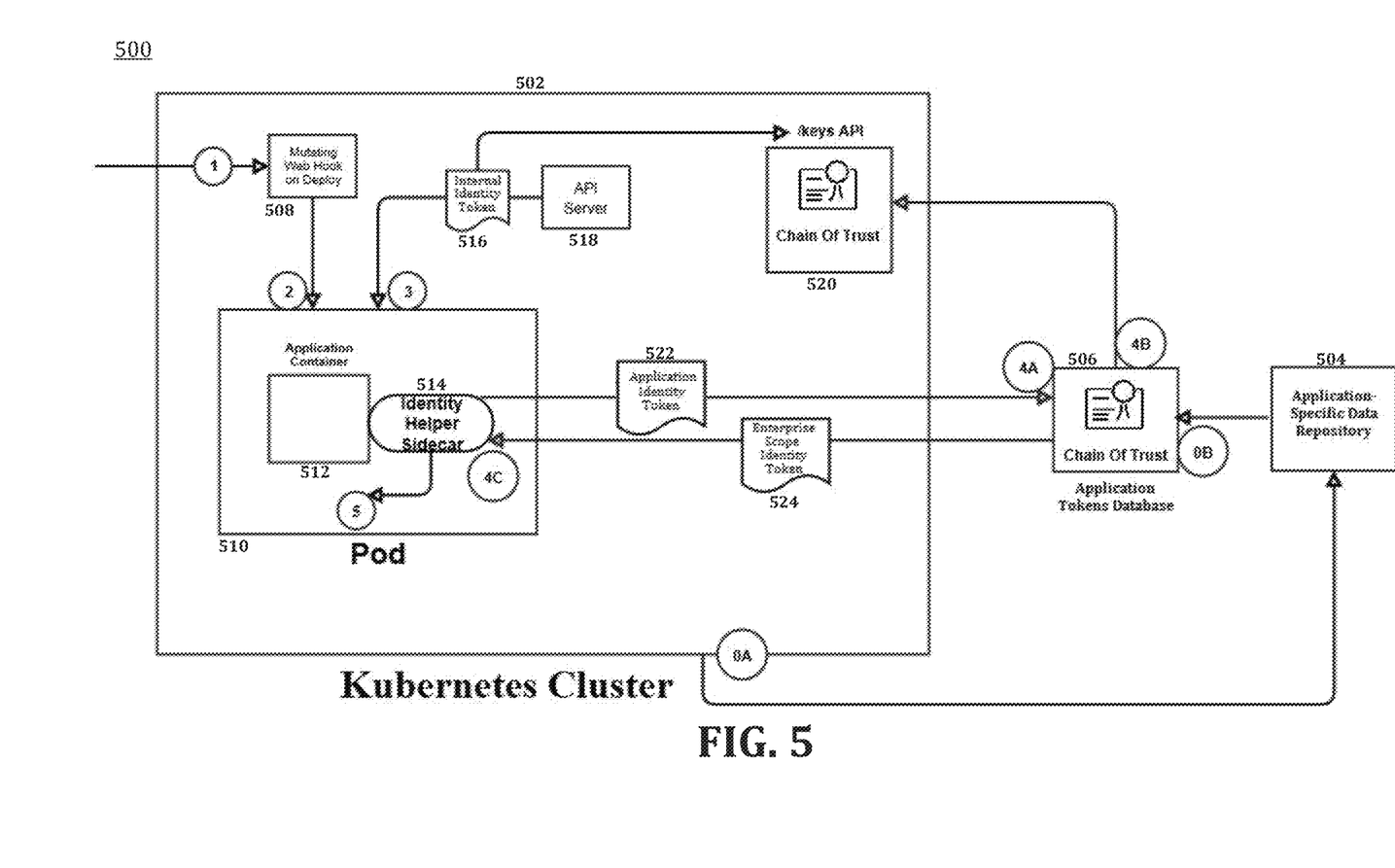
FIG. 5 is a data flow diagram that illustrates an implementation of a method for facilitating an identification of an application that runs on a platform, according to an exemplary embodiment.

Referring to FIG. 5, a first data flow diagram 500 is shown. According to an exemplary embodiment, an Application Programming Interface (API) of an application tokens database 506 may be provided with an application identity token 522 (e.g., in the form of a JWT) and may return an identity token with enterprise scope 524 (e.g., in the form of a KCC). The application identity token 522 may have a meaning (or scope) that is not recognized or valid between enterprise applications. The application identity token 522 may have a reduced scope when compared with the scope of the identity token with enterprise scope 524. The scope may include information relating to two or more parties. An application identity token 522 may include information such as, for example, an issuer (i.e., the cluster from which the application identity token 522 is issued), an expiration time (i.e., when the token expires), an issuance time (i.e., when the token was issued), a name space, a secret name, a service account name, a service account unique identifier (UID), and a pod name.

In an exemplary embodiment, at least one of an application identity token 522 and an internal identity token 516 is validated. In an exemplary embodiment, in Step 0A, when a new cluster 502 is created, a uniform resource locator (URL) may be registered with application-specific data repository 504 and may host a public key of the cluster 502. In an exemplary embodiment, the cluster 502 may publish metadata to application-specific data repository 504 at creation time. The URL registered with application-specific data repository 504 may be added to the metadata. The cluster 502 may be a Kubernetes cluster or any platform which supports a running instance of an application. Although the present application describes specific embodiments which may be implemented using Kubernetes, it is to be understood that other systems for automating application deployment, scaling, and management may be used. For example, at least one of another platform or operating system virtualization tool for automating deployment, scaling, and operations of a plurality of application nodes, workers, minions, or machines where workloads are deployed (e.g., across a plurality of hosts) may be used.

At Step 0B, application-specific data repository 504 may provide cluster metadata to application tokens database 506. The cluster metadata may include the URL registered with application-specific data repository 504. Application tokens database 506 may use the URL registered with application-specific data repository 504 to look up the cluster's public key from which the at least one of an application identity token 522 and an internal identity token 516 originates. The public key may be used to sign the at least one of an application identity token 522 and an internal identity token 516. And, the application tokens database 506 may validate the at least one of an application identity token 522 and an internal identity token 516.

At Step 1, a format may be obtained that users may use to annotate deployment human-readable data-serialization language information, for example, to enable an identity helper and specify an identification or list of identifications. The identification may be an account name, and the list of identifications may be a list of account names. The deployment may be decorated with a token volume project. The cluster 502 may receive metadata including, for example, information such as a name of a pod. The cluster 502 may also receive information relating to an API version number. Upon deployment, a module 508 of the cluster 502 may be used as an admission controller, e.g., a mutating webhook admission controller.

At Step 2, a separate container, e.g., a sidecar, may be injected into group of containers that are deployed together on the same host, e.g., a pod 510. The pod 510 may include an application container 512 and an identity helper sidecar 514. In an exemplary embodiment, the sidecar 514 may be implemented to use the application identity token 522 to broker an identity token with enterprise scope. Although the present application describes specific embodiments which may be implemented using containers, pods, and sidecars, it is to be understood that at least one of other nodes, workers, minions, and machines where workloads are deployed may be used.

At Step 3, the sidecar 514 may be implemented to use the application identity token 522 to broker an identity token with enterprise scope 524. In an exemplary embodiment, the pod 510 is provided with a platform internal token 516. In an exemplary embodiment, the platform internal token 516 is a JWT. In another exemplary embodiment, the platform internal identity token 516 is in the form of at least one X.509 certificate. The platform internal token 516 is a signed token which identifies the bearer to a party which trusts the issuer. The platform internal token 516 may be directly or indirectly connected to an API Server 518. A keys API 520 may be provided with the platform internal token 516. The keys API 520 may include or be related to a chain of trust.

In Step 4A, application tokens database 506 may receive or accept an application identity token 522 from Identity Helper Sidecar 514. In an exemplary embodiment, the application identity token 522 is a JWT. In Step 4B, application tokens database 506 may communicate information to Keys API 520. Application tokens database may have a cache which may include a Keys API URL for every cluster. The Keys API URL may be Secure Socket Layer (SSL) enabled with a certificate in the chain of trust. In Step 4C, application tokens database 506 may transmit an identity token with enterprise scope 524 to the Identity Helper Sidecar 514. A micro-service may be created to expose the public key that was used to sign the application identity token 522. Application tokens database 506 may have a certificate in a chain of trust. An SSL connection may be used in Steps 4A through 4C. The SSL connection that may be used in Steps 4A through 4C may use a certificate in the chain of trust. In Step 5, information may be determined by the Identity Helper Sidecar 514. The information determined by the Identity Helper Sidecar 514 may be used by Pod 510.

Figure 6:
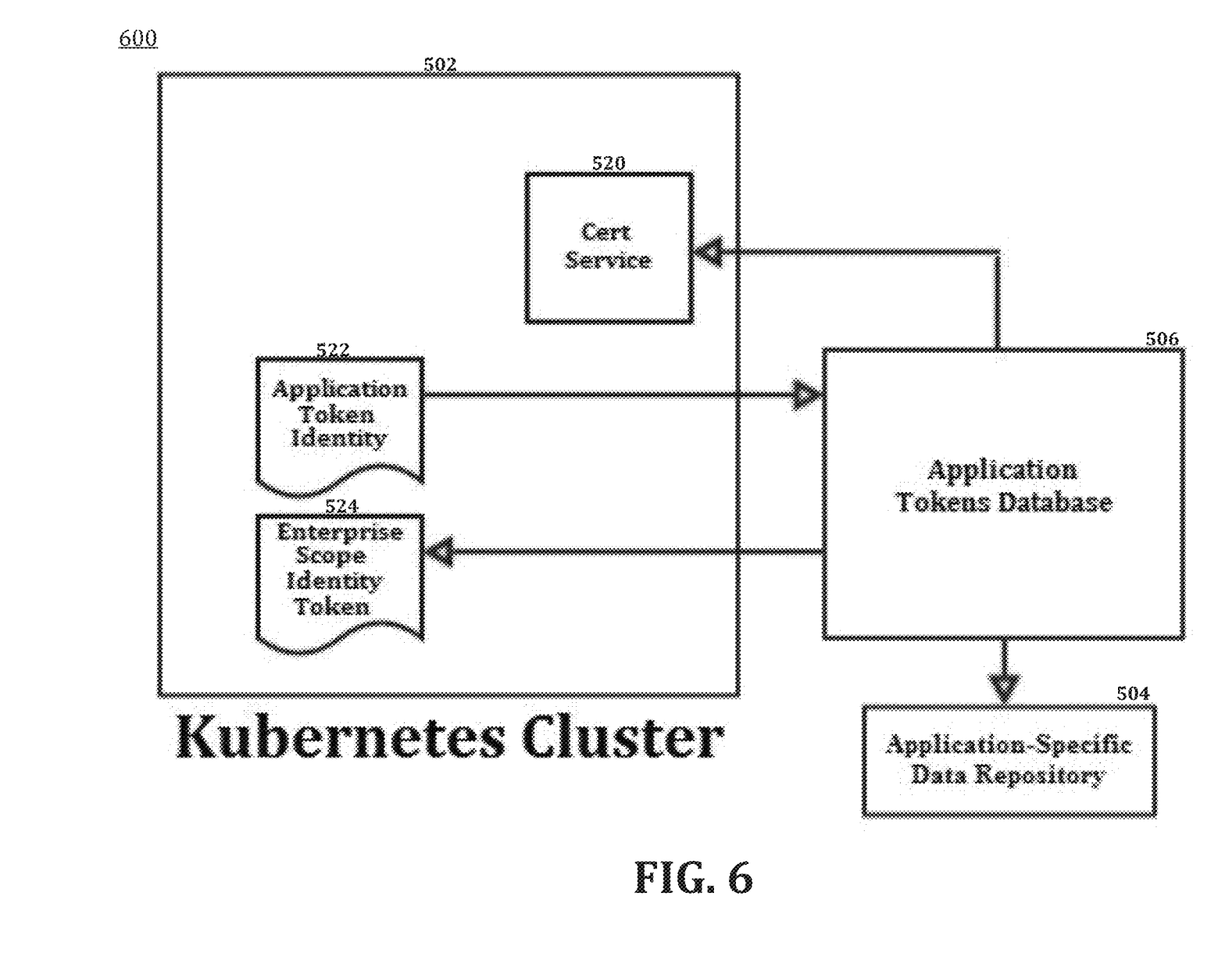
FIG. 6 is a data flow diagram that illustrates an implementation of a method for facilitating an identification of an application that runs on a platform, according to another exemplary embodiment.

Referring to FIG. 6, a second data flow diagram 600 is shown. According to an exemplary embodiment, Steps in validating an application identity token 522 are presented. A cluster 502 may include a certificate service 608, an application identity token 522, and an identity token with enterprise scope 524. The cluster 502 may be a Kubernetes cluster or any platform which supports a running instance of an application. The cluster 502 may be configured to communicate with application tokens database 506. Application tokens database 506 may be configured to communicate with application-specific data repository 504. The cluster 502 may create an entry in application-specific data repository 504 for the application identification and cluster combination. Application tokens database 506 may verify the application component and cluster combination before returning the identity token with enterprise scope 524.

Validating the application identity token 522 may include registering a URL with application-specific data repository 504 when cluster 502 is created. Application-specific data repository 504 may host a public key of the cluster 502. Application tokens database 506 may use the URL registered with application-specific data repository 504 to obtain the public key of the cluster 502 from which the application identity token 522 originates. Application tokens database 506 may use the public key to validate the application identity token 522. Further at least an application identification and a service account name may be validated. Validating the at least an application identification and a service account name may be achieved by, when a new name space is created, creating by the cluster 502 an entry in application-specific data repository 504 for the application identification and cluster combination. Application tokens database 506 may be configured to verify an application identification component and a cluster combination component in application-specific data repository 504, and application tokens database 506 may subsequently transmit an identity token with enterprise scope 524 for the service account name.

In an exemplary embodiment, application tokens database 506 may obtain a public key of cluster 502 by referencing to a certificate service 608 of the cluster 502. Application tokens database 506 may obtain a URL of certificate service 608 for the cluster 502 by referencing application-specific data repository 504.

In an exemplary embodiment, at least one token (e.g., at least one of the application identity token 522, the enterprise scope identity token 524, and the internal identity token 516) may expire and may be replaced with at least one new token. Replacing an expired token with a new token may include replacing a service account token using a projected volume.

Figure 7:
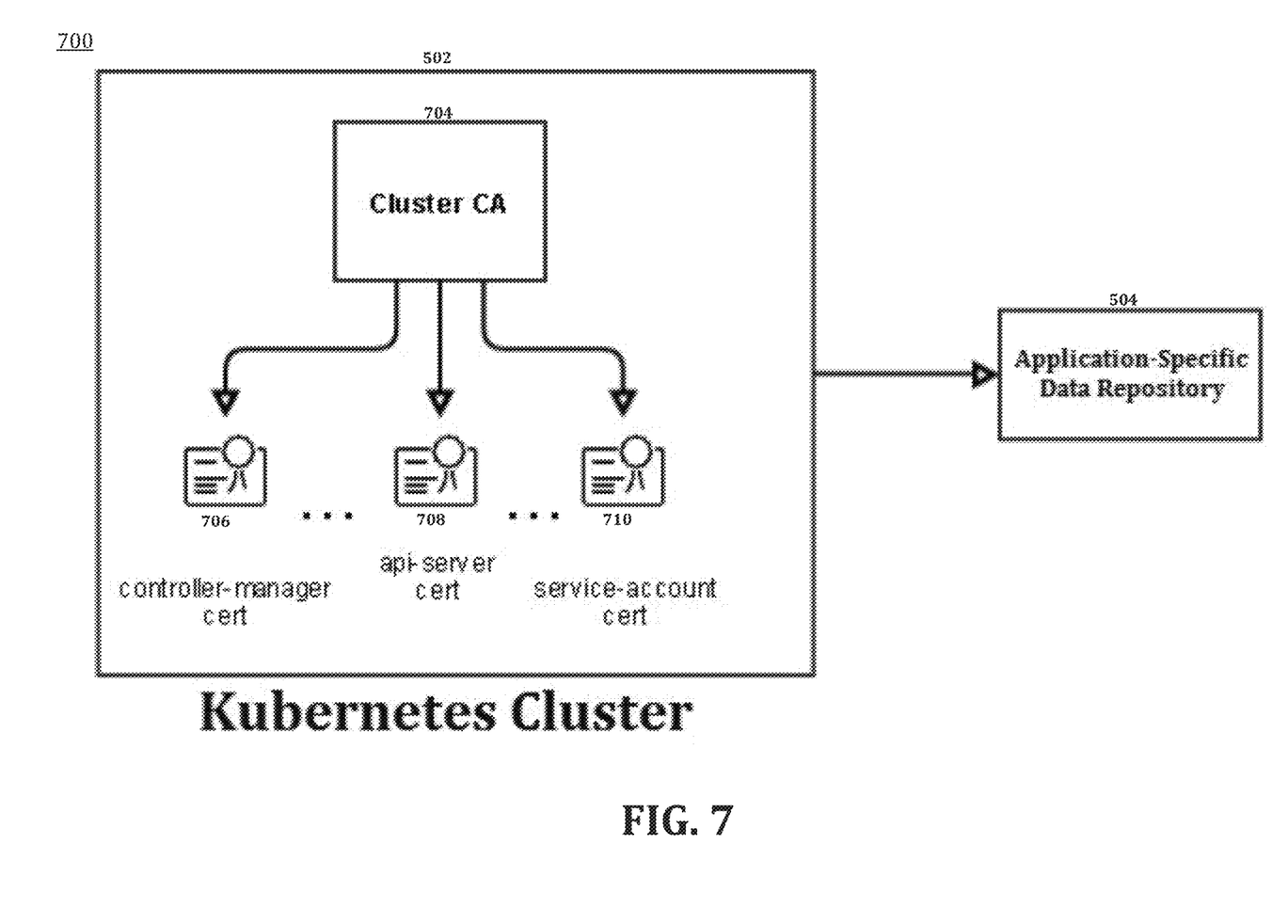
FIG. 7 is a data flow diagram that illustrates an implementation of a method for facilitating an identification of an application that runs on a platform, according to yet another exemplary embodiment.

Referring to FIG. 7, a third data flow diagram 700 is shown. According to an exemplary embodiment, a cluster 502 (e.g., Kubernetes cluster or any platform which supports a running instance of an application) may be in communication with application-specific data repository 504. In an exemplary embodiment, the cluster 502 publishes a public key endpoint URL to application-specific data repository 504. The cluster 502 may include a cluster Certificate Authority (CA) 704 that is configured to issue a plurality of certificates, including, but not limited to, a controller-manager certificate 706, an API-server certificate 708, and a service-account certificate 710.

There may be relevant API Server Parameters. For example, relevant API Server Parameters may include, but are not limited to, a service account key file, a service account signing key file, a service account issuer, and a service account API audience. The service account key file may relate to a private key used to sign a service account application identity token. The service account signing key file may relate to a public key used to sign a service account application identity token. The service account issuer may relate to an issuer attribute in the certificate used to sign the application identity token. The service account API audience may relate to at least one service account token that may be transmitted via a projected volume method. The at least one service account token may have a tag with a specified audience value.

According to an exemplary embodiment, a cluster may be created and a sidecar may broker an identity. An application tokens database API may obtain an application identity token issued by a platform. The application tokens database API may issue an identity token with enterprise scope for a container to which the application identity token is issued. At cluster creation, each cluster may publish metadata to application-specific data repository. Metadata published to application-specific data repository may include cluster name, endpoint (i.e., a URL of the endpoint), and an environment identifier. The environment identifier may specify, for example, a development environment, a testing environment, a user acceptance testing environment, a staging environment, or a production environment. Metadata may be cached by application tokens database and may be used to validate an API.

A name space may be named according to a convention. A name space convention may include parameters such as a name of a microservice, an application identification, an environment identification, and a deployment identification. The name space may be created by an application owner. Upon creation of a name space, the cluster may publish metadata to application-specific data repository. The published metadata may include, for example, application identification, deployment identification, environment information, and cluster information.

When an application is onboarded to application tokens database, the application owner may select or specify particular functional identifications to on-board to a cluster. Upon such selection or specification, an entry may obtain metadata such as application identification, functional identification, environment information, and cluster information.

The application identity token may be issued by the platform to the application. There may be attributes of interest for application tokens database. Exemplary attributes of interest for application tokens database include an issuer (e.g., the cluster from which the application identity token is issued); a name space the container is running under (which may be deconstructed using a convention); token expiration time; and time of token issuance.

In an exemplary embodiment, a sidecar that is brokering the identity token with enterprise scope on behalf of the application used to sign a service account application identity token may provide functional identification relating to container functionality. Application tokens database may perform checks before issuing the identity token with enterprise scope. In an exemplary embodiment, the application tokens database checks at least one of a time for which the token is valid (e.g., an expiration time or when the token was issued); the validity of the token signature (e.g., by referencing the token issuer attribute, obtaining the URL registered with application-specific data repository 504 in the cache for that cluster, and verifying the signature on the application identity token); and a verification that the application deployment is valid. In an exemplary embodiment, a decision matrix is used to make decisions.

Accordingly, with this technology, a process for facilitating an identification of an application that runs on a platform is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certification proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating an identification of an application that runs on at least one platform that includes at least one processor, the method comprising:
    receiving, by the at least one processor, a request to deploy an instance of the application on the at least one platform and at least one authentication credential relating to an owner of the application;
    authenticating, by the at least one processor, the request to deploy the instance of the application on the at least one platform using the at least one authentication credential;
    deploying, by the at least one processor, the instance of the application on the at least one platform based on the authenticating the request to deploy the instance of the application;
    recording, by the at least one processor, an association between the owner of the application and the instance of the application on the at least one platform;
    initiating, by the at least one processor, an execution of the instance of the application without the at least one authentication credential;
    issuing, by the at least one processor, a platform-local identity token to the instance of the application;
    authenticating, by the at least one processor, a request for a token describing the application owner using the platform-local identity token;
    receiving, by the at least one processor, the requested token describing the application owner based on the authenticating the request for the token describing the application owner;
    using, by the at least one processor, the token describing the application owner to request an enterprise token describing an identity of the application;
    receiving, by the at least one processor, the enterprise token describing the identity of the application when the platform is trusted by the enterprise to be running the application instance; and
    using, by the at least one processor, the enterprise token describing the identity of the application to authenticate with at least one other application.

2. The method of claim 1, further comprising connecting to the at least one other application.

3. The method of claim 2, wherein the enterprise token describing the identity of the application describes the identity of the application such that the identity of the application is recognized and trusted by the at least one other application.

4. The method of claim 1, wherein at least one of the platform-local identity token and the enterprise token describing the identity of the application comprises at least one of an application identifier, a platform instance identifier, and a platform tenant space identifier.

5. The method of claim 1, wherein the token describing the application owner comprises information that relates to an association between a user account and the application.

6. The method of claim 5, wherein the information that relates to the association between the user account and the application comprises information regarding at least one user account that has authorization to deploy the application on behalf of the application owner.

7. The method of claim 1, wherein at least one of the platform-local identity token, the token describing the application owner, and the enterprise token describing the identity of the application is valid for a predetermined amount of time.

8. The method of claim 7, wherein upon expiration of the predetermined amount of time, the at least one of the platform-local identity token, the token describing the application owner, and the enterprise token describing the identity of the application is replaced by another access token.

9. The method of claim 1, wherein the at least one authentication credential comprises a password.

10. A computing apparatus for facilitating an identification of an application, the computing apparatus comprising:
    a processor;
    a memory; and
    a communication interface coupled to each of the processor and the memory,
    wherein the processor is configured to:
        receive a request to deploy an instance of the application on the at least one platform and at least one authentication credential relating to an owner of the application;
        authenticate the request to deploy the instance of the application on the at least one platform using the at least one authentication credential;
        deploy the instance of the application on the at least one platform based on the authenticating the request to deploy the instance of the application;
        record an association between the owner of the application and the instance of the application on the at least one platform;
        initiate an execution of the instance of the application without the at least one authentication credential;
        issue a platform-local identity token to the instance of the application;
        authenticate a request for a token describing the application owner using the platform-local identity token;
        receive the requested token describing the application owner based on the authenticating the request for the token describing the application owner;
        use the token describing the application owner to request an enterprise token describing an identity of the application;
        receive the enterprise token describing the identity of the application when the platform is trusted by the enterprise to be running the application instance; and
        use the enterprise token describing the identity of the application to authenticate with at least one other application.

11. The computing apparatus of claim 10, wherein the processor is further configured to connect to the at least one other application.

12. The computing apparatus of claim 11, wherein the enterprise token describing the identity of the application describes the identity of the application such that the identity of the application is recognized and trusted by the at least one other application.

13. The computing apparatus of claim 10, wherein at least one of the platform-local identity token and the enterprise token describing the identity of the application comprises at least one of an application identifier, a platform instance identifier, and a platform tenant space identifier.

14. The computing apparatus of claim 10, wherein the token describing the application owner comprises information that relates to an association between a user account and the application.

15. The computing apparatus of claim 10, wherein the information that relates to the association between the user account and the application comprises information regarding at least one user account that has authorization to deploy the application on behalf of the application owner.

16. The computing apparatus of claim 10, wherein at least one of the platform-local identity token, the token describing the application owner, and the enterprise token describing the identity of the application is valid for a predetermined amount of time.

17. The computing apparatus of claim 16, wherein upon expiration of the predetermined amount of time, the at least one of the platform-local identity token, the token describing the application owner, and the enterprise token describing the identity of the application is replaced by another access token.

18. The computing apparatus of claim 10, wherein the at least one authentication credential comprises a password.

\* \* \* \* \*